United States Patent [19]

Mori et al.

[11] 4,292,178
[45] Sep. 29, 1981

[54] FILTERING APPARATUS

[76] Inventors: Takehiko Mori; Kazuo Mori, both of No. 3-23-8, Okusawa, Setagaya-Ku, Tokyo, Japan

[21] Appl. No.: 62,935

[22] Filed: Aug. 2, 1979

[51] Int. Cl.$^3$ .................... B01D 29/38; B01D 25/34
[52] U.S. Cl. .................................. 210/352; 210/488
[58] Field of Search ............... 210/108, 488, 492, 352, 210/340

[56] References Cited

U.S. PATENT DOCUMENTS

| | | | |
|---|---|---|---|
| 1,643,299 | 9/1927 | Furness | 210/488 |
| 2,521,060 | 9/1950 | Hallinan | 210/352 X |
| 2,583,423 | 1/1952 | Hallinan | 210/488 X |
| 3,157,131 | 11/1964 | Brydon | 210/108 X |
| 3,221,888 | 12/1965 | Muller | 210/340 X |

FOREIGN PATENT DOCUMENTS

| | | | |
|---|---|---|---|
| 1210052 | 9/1959 | France | 210/488 |
| 72536 | 1/1929 | Sweden | 210/488 |
| 406068 | 2/1934 | United Kingdom | 210/352 |

*Primary Examiner*—Frank A. Spear, Jr.
*Attorney, Agent, or Firm*—Thomas R. Morrison

[57] ABSTRACT

A filtering apparatus includes a plurality of disc-type filtering elements stacked in parallel with each other. Each disc-type filtering element has one or more annular projections thereon facing an adjacent disc defining a filtering slit. One or more fluid passages define a filtering path therethrough. Fine particles are filtered from a fluid by the slits between the adjacent filtering elements. Adjustment of the slit widths permits trapped particles to be removed by back-washing. A power cylinder permits automatic filtering and back-washing.

3 Claims, 5 Drawing Figures

FILTERING APPARATUS

BACKGROUND OF THE INVENTION

This invention relates to a filtering apparatus, and more particularly a self-washing filtering apparatus having a plurality of disc-type elements.

Conventional filtering devices require fine mesh for filtering very finely divided particles. However, finer the mesh, the more easily it is clogged. A method of preventing such clogging is an important technical task. For filtering such finely divided particles, various kinds of membranes are used as a material of fine mesh. Industrial applications need efficient and accurate filtering devices capable of filtering particles in the range of $1\mu$ to $100\mu$. The above membranes have a number of drawbacks. When clogged, stained or polluted such membranes must manually be removed and replaced with new membranes.

OBJECTS AND BRIEF SUMMARY OF THE INVENTION

It is an object of the present invention to provide a filtering apparatus which avoids the drawbacks of the prior art.

It is a further object of the present invention to provide a filtering apparatus which may be automatically cleaned of trapped particles.

It is a further object of the invention to provide a filtering apparatus which permits removal of trapped particles by back-washing.

It is a further object of this invention to provide a filtering apparatus having a plurality of disc-type filtering elements superposed in parallel with each other, each disc-type filtering element having one or more concentric annular projections along an external periphery thereof defining filtering slits between the annular projections and a surface of the adjacent disc-like filtering element, thereby providing a filtering path. The filtering path also includes one or more passages associated with the two or more disc-type filtering elements.

Particles in the fluid are filtered by the slits between adjacent disc-type filtering elements. By widening the slit diameters at one's option, trapped particles can be removed by back washing.

It is another object of this invention to provide a filtering apparatus in which operation filtering and back-washing operations may be carried out automatically.

According to an object of the invention, there is provided a filtering apparatus comprising at least first and second discs stacked with a first surface of the first disc facing a first surface of the second disc, at least one annular projection on the first surface of the first disc, means for maintaining the at least one annular projection a predetermined distance from the first surface of the second disc whereby at least one filtering slit having a predetermined width is formed therebetween, and passage means for fluid communication with a location between the first and second disc radially inward of the at least one filtering slit.

Other features and advantages of this invention will be apparent from the following description in connection with the accompanying drawings.

BRIEF DESCRIPTION OF THE INVENTION

DETAILED DESCRIPTION OF THE INVENTION

Preferred examples of this invention will now be described in connection with the accompanying drawings.

Figure 1A:
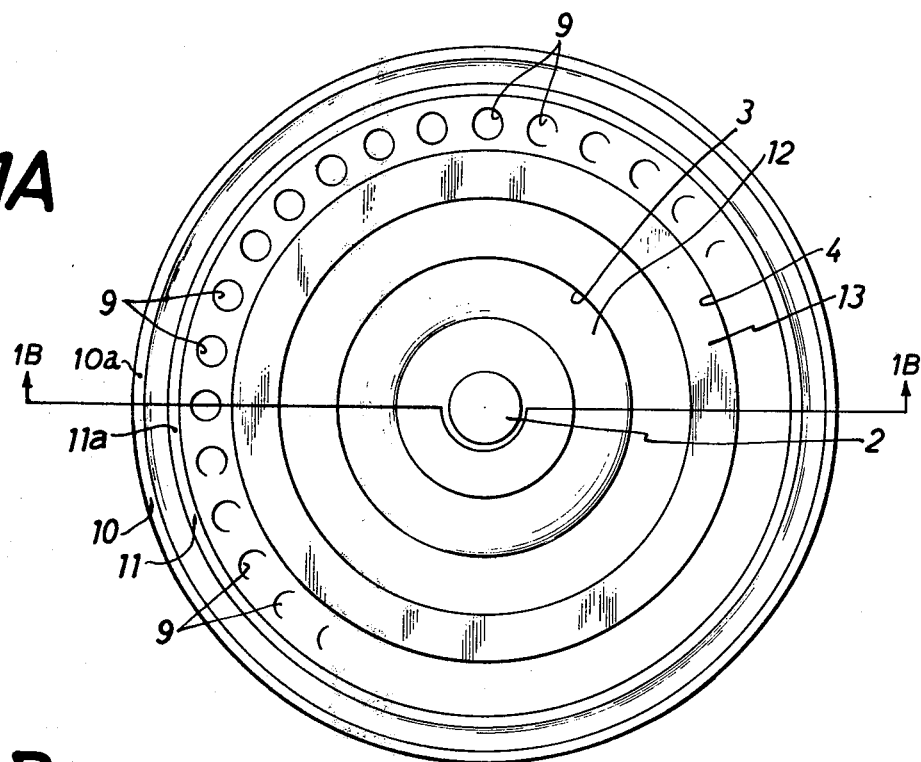
FIG. 1A is a plan view of a disc-type filtering element in a filtering apparatus according to an embodiment of the invention.
Figure 1B:
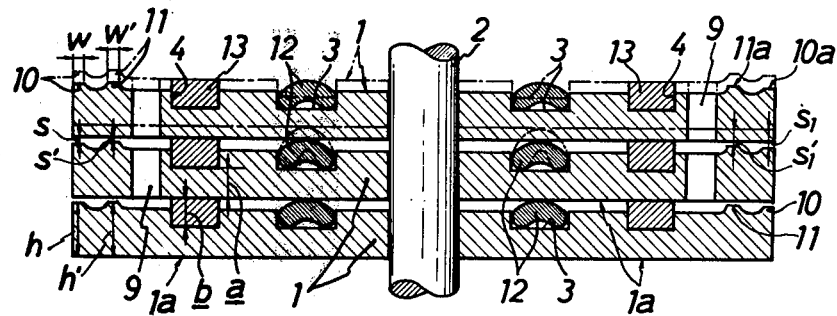
FIG. 1B is a cross section of the filtering elements taken along line 1B—1B of FIG. 1A.

Referring now to FIGS. 1A and 1B, a plurality disc-type filtering elements 1, having a preferred thickness are stacked in parallel with each other. Each disc-type filtering element 1 can be made of any suitable material such as metals including stainless steel, copper alloy, aluminium alloy, synthetic resin materials such as polytetrafluoroethylene, vinyl chloride or other materials such as carbon material.

A shaft 2 passes through a center hole in each element 1.

Each disc-type filtering element 1 has an annular channel 3 on its surface for mounting therein an annular spring 12 having a semicircular cross section, a second annular channel 4 for mounting an annular ring 13 having rectangular or square cross section therein, a plurality of fluid passages 9 spaced from each other and annular projections 10, 11 each having a different height. A height h between a bottom 1a of the element 1 and a flattened top 10a of the outer projection 10 is less than a height h' between a bottom 1a of the element 1 and a flattened top 11a of the projection 11. A slit s is formed between the top 10a and the element bottom 1a. A slit s' is formed between the top 11a and the element bottom 1a. Accordingly, h'>h and s>s'. A concave portion between projections 10, 11, holds particles which are trapped between slits s and s'.

Passage 9 need not be circular but can have any convenient shape. The lowest element of the plurality of disc-type filtering elements has no passage 9.

The thickness of annular ring 13 adjusts the slit widths s and s' between adjacent disc-type filtering elements 1. Preferably, sets of rings each having a different thickness may be prepared in advance. The slit widths can thus be varied at one's option by changing annular ring 13. Annular spring 12 is shown with a semicircular cross section, but it may optionally be an O-ring. The spring 12 is made of any suitable material having good springiness such as metal and plastic but is preferably made of fluorine rubber. Ring 13 may be made of the same material as the disc-type filtering element 1.

Further, a filter may be made in which h>h', that is, the outer projection 10 is higher than the inner projection 11. In this case, fluid enters through passages 9 and is filtered through the second slit s' and then the first slit s. Trapped particles are retained in the concave portion.

In this example, two projections 10, 11 are shown. Alternatively, more than two projections can be formed in order to further enhance the filtering effect.

Figure 2:
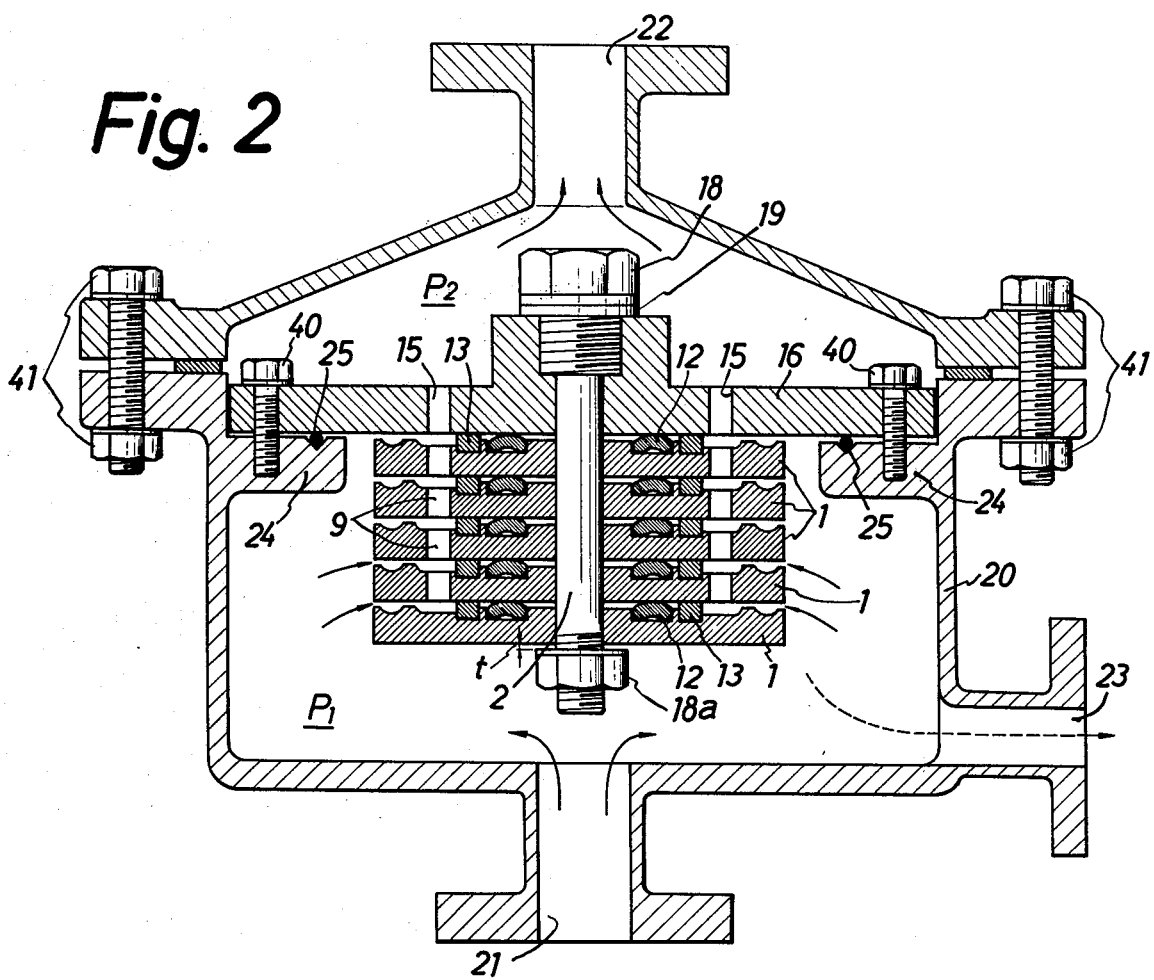
FIG. 2 is a vertical cross section of a filtering apparatus incorporating the disc-type filtering elements of FIG. 1A.

FIG. 2 shows an example of a filtering apparatus in which are incorporated a plurality of disc-type filtering elements 1.

A sealing plate 16 on top of the uppermost element 1 includes passages 15 generally aligned with passages 9 of the elements 1. Center shaft 2 inserted in the center holes of the respective elements 1 is threaded at its two ends. Nuts 18 and 18a on the threaded ends of shaft 2 clamp the elements together and affix them to sealing plate 16. A sealing disc 19 between the bolt 18 and the sealing plate 16 prevents leakage of fluid about the center shaft 2.

A filter case 20 has upper and lower halves enclosing sealing plate 16 and the affixed stack of elements 1. The upper and lower halves of filter case 20 are sealingly secured together using any convenient clamping means such as nuts and bolts 41.

The filter case 20 includes a fluid inlet port 21 and a fluid outlet port 22. An exhaust port 23 in filter case 20 is provided through which trapped particles are discharged. During filtering, the exhaust port 23 is, of course, closed. Supports 24 integrally formed in filter case 20 provide a surface against which the sealing plate 16 and the plurality of elements 1 are all firmly fixed using any convenient clamping means such as bolts 40. An O-ring 25 between the sealing plate 16 and the support 24 prevents fluid leakage therebetween.

Figure 3:
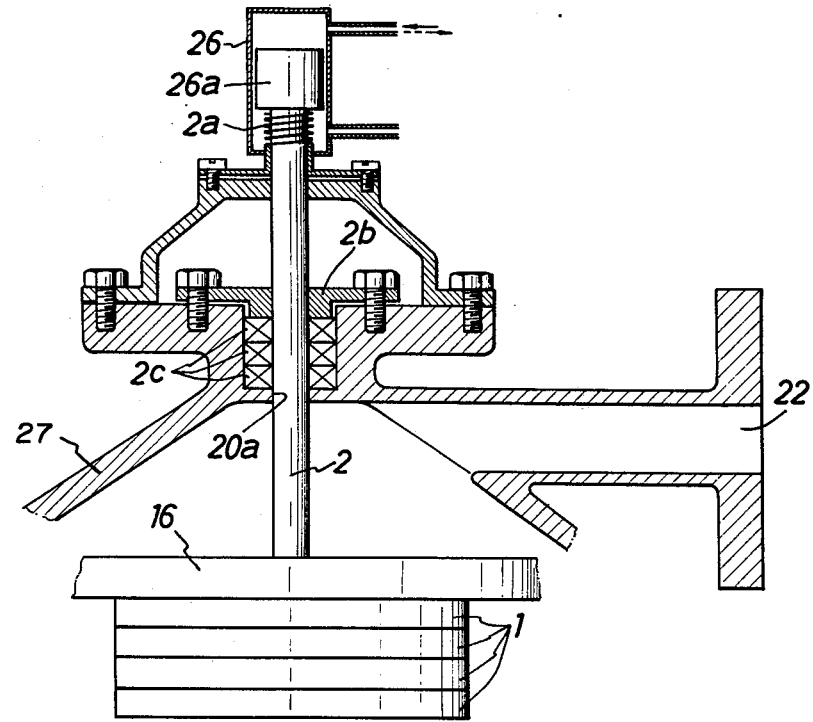
FIG. 3 is a cross section of a part of another filtering apparatus which includes the disc-type filtering elements of FIG. 1A.

FIG. 3 is another example of a filtering apparatus according to this invention. In this example, the center shaft 2 is moved upwardly and downwardly by a cylinder 26 and a piston 26a. A case 27 includes a hole 20a for guiding upward and downward movement of the shaft 2 and an outlet 22. The piston 26a is mounted on the top of the shaft 2, is disposed in a cylinder 26. A spring 2a urges piston 26a and shaft 2 in the upward direction. Seals 2c, mounted in the guiding hole 20a, are compressed by a keeper 2b to thus seal guiding hole 20a against leakage.

The function of the filtering apparatus according to this invention will now be described.

When a plurality of disc-type filtering elements 1 are firmly tightened against the resilience of the annular spring members 12 (FIG. 1B) $h+s=a+b$ wherein h=height of the element 1, s=slit diameter width between the top 10a of the projection 10 of the element 1 and the bottom 1a of the adjacent element 1 thereabove, a=height between the bottom 1a of the element 1 and the bottom of the ring 4, and b=height of the ring 4. The slit width s for filtering is, therefore, $s=(a+b)-h=(a-h)+b$.

The symbols h and a are fixed at the time of machining, but the height b of the ring 13 is adjustable at one's own option. That is, by preparing several rings in advance having different heights, it is possible to mount a ring 13 in the annular channel 4 which provides a desired slit width.

As shown in FIG. 1B, the h and s are located at the outer perimeter of elements 1. In addition to this, the which s', s" between the top of the portions h' respectively and the bottom 1a of the element 1 can be expressed as follows:

$$s'=(a-h')+b$$

A third annular projection (not shown) may be located inward of annular projection 11. A height h" of the third annular projection may be higher than height h' of annular projection 11. Thus a slit width s" between the third annular projection is smaller than the slit width s'.

When $h<h'<h''$, and $s>s'>s''$ finer particles are filtered at each progressively narrower slit. Thus, filtering is enhanced. Even if $s=s'=s''$, filtering is improved over a single or double slit.

When fluid passes through one or more slits, its velocity is in proportion to the differential pressure across the slit. With the total pressure shared across a plurality of slits, the lower velocity through downstream slits enhances the ability of these slits to achieve filtering.

Further, the velocity is in inverse proportion to the slit spacing, w, w' respectively as well as to viscosity. The spacing w is to be defined in connection with the velocity, but the smaller width is better. When the clamping force on a plurality of disc-type filtering elements 1 is loosened, they are moved apart from each other by annular spring members 12 as shown by dash lines in FIG. 1B.

Accordingly, $h+s_1>a+b$, $h+s_1'>a+b$, $s_1>s$ and $s_1'>s'$. The increased dimension permits easy removal of trapped particles.

The operation of the filtering apparatus in FIG. 2 will now be described.

When clamped firmly by nuts 18 and 18a, each slit width is defined by the ring height b (FIG. 1B). The fluid coming from the inlet 21 is led to the outlet 22 through the slits s, s' and the internal passages 9 and 15. Particles larger than the slit s are not admitted to the filter elements 1 but remain in an inlet section $P_1$ of filter case 20. Particles smaller than the slit s enter the slit s. Particles smaller than the slit s' slit s'and, pass through slit s' and the internal passages 9, 15 to the outlet section $P_2$. Due to the sealing member 19 and the O-ring 25, any particles trapped in the inlet section $P_1$ are prevented from entering the outlet section $P_2$.

Particles trapped in inlet secton $P_1$ be removed by back-washing in the usual way. The particles trapped inside the elements 1 can also be removed by back-washing. When, when the nut 18a is loosened, each slit is enlarged due to resilience of the spring members 12. Under the above condition, when water flow from the outlet 22, it can completely remove the particles remained in the slits and internal passages 15, 9 and discharge them through exhaust port 23.

When a pitch t of threads on the nut 18a is known one revolution of nut 18a increases the slit widths s and s' to the following, $s_1=s+t/n$, $s_1'=s'+t/n$, wherein n = number of the disc-type filtering elements 1.

Thus, suitably adjusting nut 18a permits varying the slit diameter between the elements. This is an unique feature of this invention.

When a plurality of disc-type filtering elements 1 are released an amount t, slit width s is increased to $s_1$ and s' is increased to $s_1'$. Then, when the (differential pressure $\Delta P$ in the slit times the pressure area applied to the element 1 becomes larger than the strength of the spring member 12, spring member 12 is compressed by the pressure whereby $s_1$ is decreased to s and $s_1'$ is decreased to s'. As $s_1$ is returned to s, the differential pressure $\Delta P$ is increased. Thus, the elements 1 are even more firmly pressed together. In this way, the slit widths are automatically narrowed for filtering and widened for back-washing.

Referring to FIG. 3, a plurality of disc-type filtering elements 1 are clamped or released by means of power cylinder 26 and piston 26a which is connected to the shaft 2. By the operation of the cylinder 26 the slit widths can be adjusted at an operator's own disposal. Thus, both filtering and the back-washing can be carried out automatically.

Figure 4:
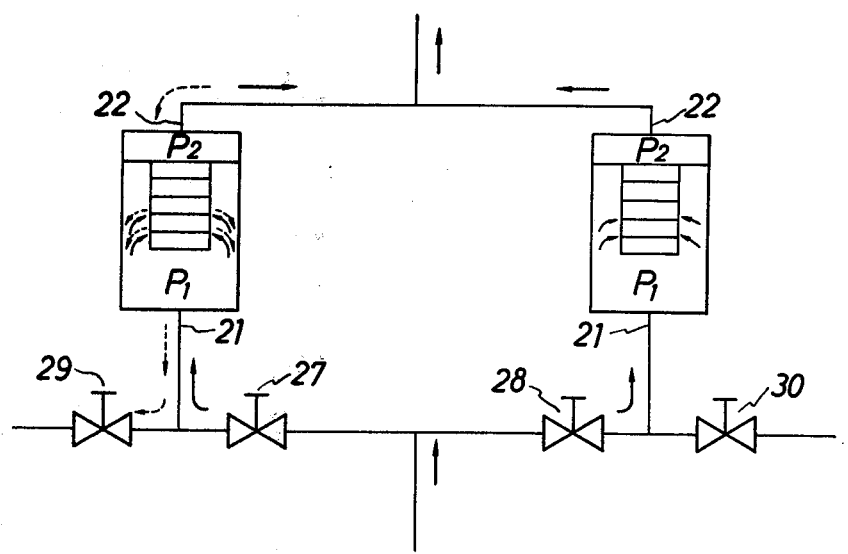
FIG. 4 is a schematic diagram of a filtering system including two filtering apparatus which are alternately connected for filtering and for back-washing.

FIG. 4 shows an example of this invention in which two filtering units corresponding to those in FIGS. 2 or 3 are disposed at both sides in a filtering apparatus. In this example, both filtering and back-washing are carried out alternately in a continuous manner by valve switching. Valves 27 and 28 control fluid flow to the inlet sections of the filtering units. Drain valves 29 and 30 control drainage flow. For simplicity, exhaust port 23 (FIG. 2) is combined into fluid inlet port 21. When inlet valve 27 is closed and the drain valve 29, is opened, fluid flows in the reverse or back-washing direction indicated by dashed arrows. A reverse differential pressure ΔP is produced. Accordingly, as soon as the valves are thus actuated, slit widths s and $s_1$ are expanded to s' and $s_1'$ and fluid flows backward through the widened slits to discharge particles previously trapped by the slits. Particles trapped in the inlet section $P_2$ are exhausted through the drain port.

By switching the valves to the filtering position, normal filtering operation in one or both filtering units can be actuated as shown by the full line. In case the differential pressure ΔP is not sufficient to compress spring member 12, it may be increased by using the power cylinder 26 in FIG. 3 to reduce the slit widths to their filtering values. When the slits widths are thus established, the increased pressure differential ΔP thereacross may be sufficient to hold the slits at their operating widths without further aid from the power cylinder 26.

As described above, the filtering apparatus according to this invention filters particles from a fluid by means of slits between a plurality of disc-type filtering elements superposed in parallel with each other, without using conventional filtering materials such as a mesh, net, membrane, etc.

According to one aspect of this invention, it is possible to adjust a slit width between adjacent elements at one's own option. Accordingly, it is possible to filter even very finely divided particles by narrowing the slit width between the adjacent filtering elements. On the other hand, by widening the slit width therebetween, particles trapped by in the slits can be easily removed by back-washing.

Still further, both filtering and back-washing can be automatically performed using a power cylinder or alternately can be performed in a continuous manner by valve switching.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A filtering apparatus comprising:
   at least first and second discs stacked with a first surface of said first disc facing a first surface of said second disc;
   at least one annular projection on said first surface of said first disc;
   means for maintaining said at least one annular projection a uniform predetermined fixed distance from said first surface of said second disc whereby at least one filtering slit having a uniform predetermined fixed width is formed therebetween;
   passage means for fluid communication with a location between said first and second discs radially inward of said at least one filtering slit; and
   said means for maintaining includes at least one resilient member urging said first and second discs apart and clamping means urging said first and second discs together.

2. A filtering apparatus comprising:
   at least first and second discs stacked with a first surface of said first disc facing a first surface of said second disc;
   at least one annular projection on said first surface of said first disc;
   means for maintaining said at least one annular projection a uniform predetermined fixed distance from said first surface of said second disc whereby at least one filtering slit having a uniform predetermined fixed width is formed therebetween;
   passage means for fluid communication with a location between said first and second discs radially inward of said at least one filtering slit;
   said means for maintaining includes at least one resilient member urging said first and second discs apart and clamping means urging said first and second discs together; and
   said clamping means includes a piston and a cylinder, said piston and cylinder being further operative to permit said first and second discs to move apart under uring of said resilient member for back flushing.

3. A filtering apparatus comprising:
   at least first and second discs stacked with a first surface of said first disc facing a first surface of said second disc;
   at least one annular projection of said first surface of said first disc;
   means for maintaining said at least one annular projection a uniform predetermined fixed distance from said first surface of said second disc whereby at least one filtering slit having a uniform predetermined fixed width is formed therebetween;
   passage means for fluid communication with a location between said first and second discs radially inward of said at least one filtering slit;
   said clamping means includes a piston and a cylinder, said pistion and cylinder being further operative to permit said first and second discs to move apart under urging of said resilient member for back flushing; and
   said clamping means is operative to at least partially release it urging of said first and second discs and said at least one resilient member is operative to move said first and second discs apart whereby the width of said filtering slit is increased to permit back flushing of particles from said filtering apparatus.

* * * * *